May 28, 1968  TAKAHO KAWAWA  3,385,585
ROTARY FURNACE FOR CONTINUOUSLY REFINING MOLTEN METAL
Filed Feb. 25, 1965
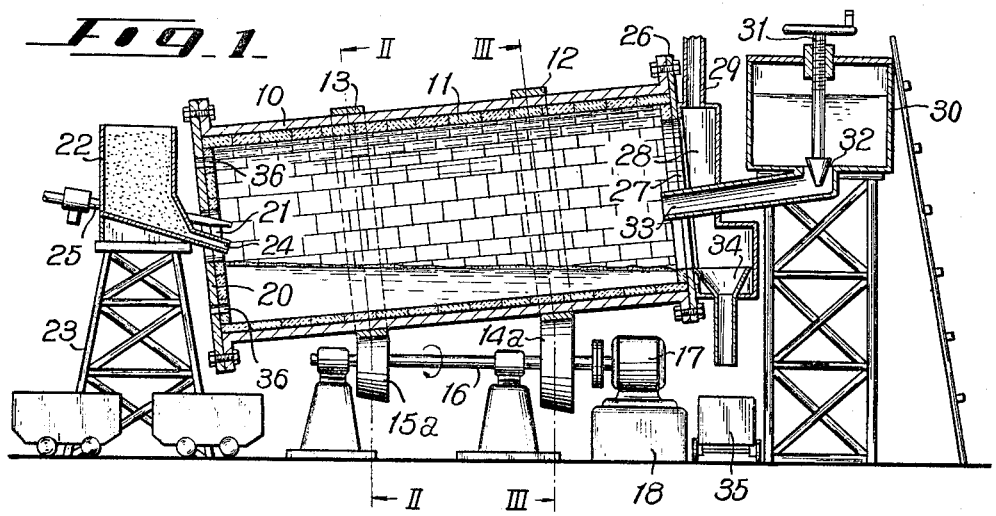
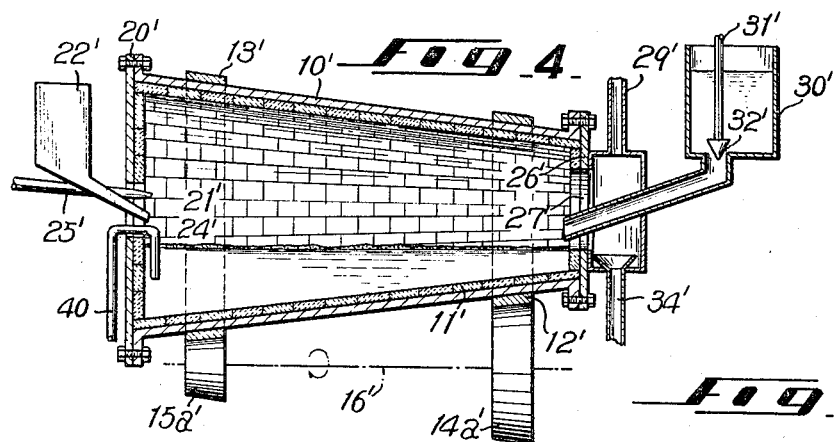
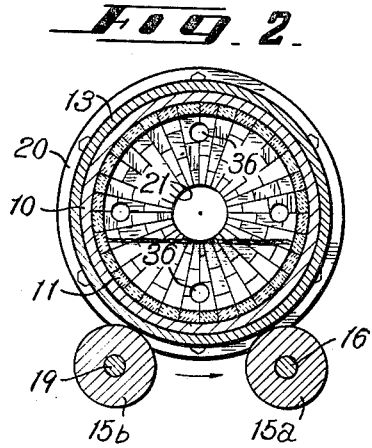
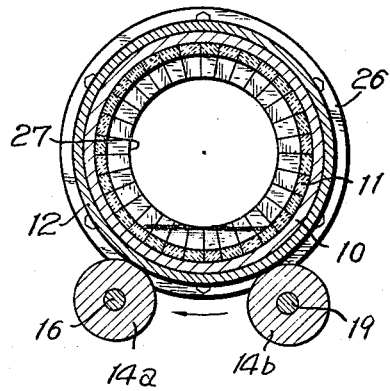
INVENTOR.
TAKAHO KAWAWA
BY
ATTORNEYS

United States Patent Office 3,385,585
Patented May 28, 1968

3,385,585
ROTARY FURNACE FOR CONTINUOUSLY
REFINING MOLTEN METAL
Takaho Kawawa, Kawasaki-shi, Japan, assignor to
Nippon Kokan Kabushiki Kaisha
Filed Feb. 25, 1965, Ser. No. 435,190
Claims priority, application Japan, Feb. 28, 1964,
39/10,926
8 Claims. (Cl. 266—18)

ABSTRACT OF THE DISCLOSURE

A rotary furnace for continuously refining molten metal is disclosed as including a relatively elongated circular cross section container having end plates at opposite ends, one end plate being formed with a relatively large diameter opening and the second end plate being formed with a relatively small diameter opening. At least the lower arcuate extent of the interior surface of the container slopes downwardly relative to a horizontal plane, from the end plate having the relatively large diameter opening to the end plate having the relatively small diameter opening. The container is mounted for rotation about its axis, and driving means rotate the container at an angular velocity sufficient to agitate a body of fluid therein while maintaining the body of fluid entirely within the lower arcuate extent of the inner surface and with the upper surface of the fluid body lying generally in a substantially horizontal plane.

Molten metal is supplied to the container through the relatively large diameter opening, and slag composition is supplied to the container through the relatively small diameter opening, the slag composition being melted during agitation by rotation of the container, with the molten slag composition forming a layer floating on the substantially horizontal surface of the body of molten metal and overflowing through the relatively large diameter opening. Molten metal discharge means are provided adjacent the end of the container having the relatively small diameter opening in its end plate, and withdraw molten metal from beneath the slag layer at a substantially constant rate and continuously. A burner extends through the relatively small diameter opening in an end plate, and the products of combustion are discharged through the relatively large diameter opening in an end plate.

Background of the invention

This invention relates to rotary furnaces for continuously refining molten metals.

In addition to conventional metal refining furnaces utilizing fused slags, such as open hearth furnaces, converters, and electric furnaces, rotary furnaces have recently been developed to an amazing degree for realizing an efficient contact between the molten metal and the fused slag.

A considerable drawback of the last mentioned type of furnace resides in the operating mode on the batch principle. More specifically, a predetermined quantity of melt and a correspondingly selected quantity of slag are charged into the furnace space and upon completion of the refining reaction through contact therebetween, all the charge is poured out of the furnace for completely emptying the furnace space.

Only after the discharging or emptying operation, new charges of melt and slag are introduced again into the furnace space for carrying out a second refining operation, and so on.

Thus, the refining operation must be carried into effect only in an intermittent mode or on the batch principle, which leads naturally to a retarded operation, a reduced thermal efficiency and a high rate of labor cost.

For instance, with use of an open hearth furnace, the mean thermal efficiency will amount to about 30%.

The main object of the invention is to provide unique and highly improved rotary refining furnaces which allow an ideally recognized continuous refining operation.

For this purpose, it is proposed to provide a rotary refining furnace for treating molten metal, characterized in that the furnace proper is shaped as an elongated cylindrical vessel, arranged with its axis preferably in an inclined position and adapted to be driven to rotate about its longitudinal axis, said vessel being provided with a melt supply means mounted at one end of said vessel and slag supply means mounted at the opposite end of said vessel, so as to form counter flows of said melt, on the one hand, and of a fused slag layer, on the other hand, formed by the slag furnished from said slag supply means.

Further objects and characterizing features of the invention will appear from a detailed description given hereinbelow by way of several embodiments and numerical examples of the invention, with reference to the accompanying drawings, in which:

FIG. 1 is a partially sectioned elevational view of a preferred embodiment of the invention;

FIGS. 2 and 3 are cross-sectional views taken along cutting planes II—II and III—III in FIG. 1, respectively;

FIG. 4 is a view similar to FIG. 1, showing only substantially modified features of a second embodiment differing from the first one.

Referring now to FIGS. 1–3 of the accompanying drawing, a preferred embodiment of the invention will be described in detail.

10 denotes a furnace proper which is shaped into a rotatable cylinder fitted on its inside wall surface with a layer of refractory linings 11 composed, as conventionally in a rotary kiln, of a number of Shamotte bricks. The cylinder is provided integrally on its outer surface with a pair of separated bands 12 and 13 which are mounted on rollers 14a, 14b and 15a, 15b, respectively. Rollers 14a and 15a are connected with a shaft 16 which is adapted to be positively driven by an electric motor 17 mounted on a rigid base 18 on the floor. On the other hand, rollers 14b and 15b are freely rotatable, although they are connected rigidly with each other by a shaft 19 in a similar way. As shown, rollers 14a and 14b are larger than rollers 15a or 15b, and all these rollers are shaped as truncated cones so as to mount the cylinder 10 in an inclined position. Although not shown, there is provided stop means for the prevention of the cylinder from slidingly shifting to its possible lower position.

The lower or lefthand end of the cylinder 10 is closed by an end plate 20 which is detachably bolted thereto. This end plate is formed at its center with an opening 21.

A container 22 is mounted at one end of the cylinder 10, being supported rigidly on a supporting structure 23 standing on the floor, and container 22 is filled with a quantity of slag-forming mixture as will be described more in detail hereinafter with reference to numerical examples. The said container is formed at its bottom with a supply chute 24 which projects a small distance through the opening 21 into the inside space of the cylinder. In the neighborhood of the chute, there is provided further a burner nozzle 25 which is also mounted on the structure 23 and projects similarly into the furnace space in the cylinder. The end plate 20 is formed with a plurality of outlet openings 36 for discharging molten and refined metal, for instance, steel melt.

The higher or righthand end of the cylinder 10 is similarly fitted with an end plate 26 which is formed with a larger opening 27. The latter communicates with a smoke chamber 28 fitted with a gas outlet conduit 29, extending in the upward direction from the chamber.

30 denotes a molten metal container which is physically connected with a melting furnace, not shown, and fitted with a value means 31 arranged so as to close or open a supply opening 32 formed in the bottom wall of the container 30. This opening 32 constitutes the inlet to a supply conduit 33 extending through the smoke chamber 28 and the gas outlet opening 27 into the inside space of the furnace cylinder 10.

A slag receiver in the form of a hopper 34 is provided nearly at the bottom of the smoke chamber 28 and kept in contact with the lowest part of the opening 27, on the one hand, and discharging downwards to a slag reception vessel 35 which is placed preferably on the floor.

When the drive motor 17 is energized upon closing a switch, not shown, inserted in the power supply line to the motor, the driving rollers 14a and 15a are caused to rotate at a selected proper speed which rotation is transmitted frictionally to the bands 12 and 13, and thus to the cylinder 10. Then, valve means 31 is adjusted manually, mechanically, pneumatically, hydraulically or electrically as may be required, so as to open the bottom opening 32 of the container 30 and thus to supply the molten metal therefrom at a proper rate through conduit 33 to the interior of the rotary furnace at its upper end through opening 27. At the same time, the burner nozzle 25 is ignited to keep the temperature prevailing in the cylinder space 10 at a preselected value and the slag-forming mixture is supplied at a proper constant rate from the container or hopper 22 to the cylinder 10.

The molten metal flows from the right to the left in FIG. 1 while a thin fused slag layer is formed on the bath and will flow from the left to the right, thus in a counter flow relation to the metal. While the cylinder is rotated continuously, the slag layer and the metal bath are subjected to proper agitation and the contact therebetween is considerably accelerated in comparison with that attainable according to the conventional technique. Thanks to this agitating effect as well as the counter flow condition mentioned above, the contacting surface between both phases is constantly renewed and altered so that the desired refining effect is highly accelerated.

The thus refined metal is discharged substantially continuously from one or two of the outlet openings 36 as the latter are periodically or cyclically brought below the level of the bath. This discharge rate is maintained substantially the same as the supply rate of the melt by adjusting the valve 31, thus maintaining a predetermined quantity of the melt in the rotating cylinder. Upon reaction the fused slag is continuously and gradually discharged over the lowest part of the opening 27 into the discharge hopper 34, thence to the receptacle 35.

With use of the aforementioned rotary furnace, a highly efficient and accelerated reaction between the melt and the fused slag is obtained so that the processing time of the metal in the furnace can be considerably shortened in comparison with the case of the batch process according to the prior art, especially with use of the conventional steel refining rotary furnace. The consuming rate of the slag-forming mixture can be also correspondingly reduced.

Although the refining process can be carried into effect with use of the aforementioned rotary furnace, but arranged with its axis horizontal rather than inclined, it is preferable to adapt the inclined axis arrangement for the purpose of obtaining an improved agitating effect and for establishing a larger slag-contacting surface so as to increase the refining efficiency.

For obtaining the best possible refining efficiency, the levels of the lowest parts of both end openings 21 and 27 should be carefully selected. For this purpose, the diameters of both openings and the inclination angle of the rotary cylinder should be so selected that the reacted slag may finally overflow through the larger end opening 27, while discharge from the smaller end opening 21 is prevented.

Each of the melt discharge openings 36 carried around by the rotating cylinder 10 is first brought into contact with the floating and gradually flowing slag layer on the melt, and then with the melt per se. Thus, while passing through both molten phases, each opening 36 will serve to discharge the slag and the melt from the interior refining space of the rotary cylinder to the outside surface of the lower end plate 20, and thence to a receptacle 37. It will be apparent that the discharged quantity of the molten slag in this case is very slight on account of the small thickness of the slag layer which makes the contacting time duration of each slag discharging opening 36 with the floating slag layer very short. When it is desired to prevent completely the discharge of the molten slag in this case, movable cover means may be provided for each of the openings 26, although not shown. The cover is brought into its effective or closing position manually or mechanically, as the case may be, during each passage of the related discharge opening 36 through the slag layer.

It is preferable to select the number of the melt discharge openings 36 so as to establish practically a constant discharge flow of the melt. In the preferred embodiment shown in FIGS. 1–3, there are four such openings. With such arrangement of the discharge openings, it will be clear that, when one of these openings is about to emerge from the molten bath, the next successive opening is already immersed in the bath. It will also be clear that the melt discharge rate, attainable when these two successively arranged discharge openings are simultaneously at the upper surface of the melt, is substantially same as that which is realized by a single one of the four openings 36 when it is carried below the surface of the metal bath, in consideration of the difference in the bath depth above the related discharge opening. The dimensions of these openings have been selected so as to satisfy the required flow conditions.

While being agitated under the influence of the rotary motion of the cylindrical furnace, the melt and slag are kept in a well established contacting condition in the course of the already described counter flow. Thus, a considerably higher and more efficient refining effect may be realized with use of a smaller quantity of the slag-forming composition than that which is attainable with use of the conventional batch technique. The counter flow principle employed in the present application is of a considerable importance. In batch processing, the distribution principle will have a considerable effect upon the results of the refining operation. Thus, when an equilibrium is once established in connection with impurities between the slag and the melt, no more refining of the metal is possible beyond the concentration of impurities then contained in the melt.

In the refinery according to the present invention, the melt brought nearer to the outlet openings 36 contains always only a substantially reduced quantity of impurities and is brought into contact with the freshly introduced slag which contains naturally almost none of the impurities removed from the melt, and thus the final stage of the refining is carried into effect to a highest possible degree, yet with use of the least quantity of the virgin slag.

It would be clear from the foregoing that with use of the refining furnace according to the invention, a continuous operation under preselected conditions may be assured without difficulty and thus the refining performance of the refinery according to the invention will exceed by several times the output of the conventional refining furnace relying upon the batch principle, resulting in a considerable reduction of the labor cost per unit output.

A somewhat modified embodiment is shown in FIG. 4, wherein the discharge means for the refined melt is substantially modified. Additionally, the rotary furnace container is in the form of a truncated cone 10 mounted for rotation about its horizontally extending axis. It will be clear that, using the construction of FIG. 4, there is no appreciable adverse effect to be expected.

In this modified embodiment, a syphon type suction discharge piping 40 is provided and, after being led through a smaller end opening 41 formed in the larger end plate, one end of the syphon is immersed in the bath to a certain depth.

The syphon will also suck only the successfully refined melt. A predominant advantage assured by the employment of such syphon is that any possibility of outflowing of the slag accompanying the discharged melt is absolutely obviated. A further advantage is the possibility of simplifying the whole construction as well as the manipulation of the furnace assembly.

Under certain circumstances, however, the employment of the syphon discharge may lead to inconveniences caused by the kind, higher temperature and viscosity of the melt. In this case, the first embodiment of FIGS. 1–3 is preferable.

In this modified embodiment shown in FIG. 4, same or similar components identical or similar to those of the first embodiment are shown with the same reference numerals primed.

Now, principle and effects of the invention will be still further described by way of two processing numerical examples:

EXAMPLE 1.—DESULPHURIZING REFINING OF STEEL MELT

A horizontally mounted, truncated cone type rotary furnace as shown in FIG. 4, having a larger and a smaller diameter of 1200 mm. and 800 mm., respectively, and a length of 2000 mm., was employed.

The cone was driven at a speed of 30 r.p.m. Four melt discharge openings were employed as in the first embodiment described hereinbefore with reference to FIGS. 1–3, each having a diameter of 40 mm. The larger end opening of 400 mm. and the smaller end opening of 200 mm. were fabricated. The molten charge was continuously introduced into the cone furnace at a rate of 24.3 tons per hour and kept at about 1600° C. by igniting and adjusting the burner nozzle. The rate of discharging the refined steel melt through the four discharge openings was kept substantially the same as that for introducing the melt. The thickness of the flowing slag floating on the free surface of the melt amounted to a mean value of 70 mm. The gradually flowing pool of the melt amounted to 2.1 tons.

As the slag-forming composition, a mixture of CaO 44%; $SiO_2$ 13%; MgO 18%; CaF 15%; and MnO 10%, was used. The fused slag was discharged continuously at a rate of .15 ton per ton of the melt.

By such refining treatment, an initial content of sulphur of .063% was reduced to .004%. An output of 580 tons per 24 hours was attained. All percentages given herein were by weight.

The output from a batch type conventional steel refining rotary furnace was only 70 tons per 24 hours even when the charge for a refining operation was selected to be 3.0 tons which was a larger value for this kind of furnace. The consumed slag amounted to .3 ton per ton of the molten charge to be refined. The remaining quantity after refining amounted to .028% in comparison with the original value of .063%.

EXAMPLE 2.—DECARBONIZING AND DEPHOSPHORIZING REFINING OF STEEL MELT

As the refining furnace, that used in the foregoing Example 1 was used. In this case, however, gaseous oxygen was used to maintain the atmosphere in the furnace space acidic.

As the slag composition, a mixture of CaO 44%; SiCl 13%; MgO 18%; FeO 5% was used in the ratio of 20 kg. per ton of steel charge. In this case, the quantity of the supplied slag composition was relatively small. On account of the acidic nature of the refining atmosphere, as is commonly known, part of the Fe contained in the melt was oxidized to FeO which cooperated with the existing quantity of FeO in the slag so as to oxidize the P and C-components, thus forming $P_2O_5$ and CO. FeO was thereby transformed back to Fe.

Steel melt was introduced in the said furnace just in the same way as was described hereinbefore and a refined steel containing C .4% and P .005% was obtained in comparison with the original contents: C 1.0% and P .2%.

If a similar refining treatment should be carried out in a conventional comparative furnace the product contains P .01% and C .6% with use of an ample quantity of slag amounting to .1 ton per ton of steel melt. The refined output of steel would be a smaller value as was pointed out in the foregoing Example 1.

It will be clearly apparent that, with use of the unique and novel refining furnace according to this invention, a continuous and highly accelerated metal refining process can be realized without difficulty. Moreover, the consumed quantity of the slag-forming composition can be considerably reduced in comparison with the corresponding case of the known technique. Simplification of manipulation of the refining furnace, improvement of the thermal efficiency and a considerable reduction of the labor cost can be simultaneously attained which means a remarkable progress in the art.

Although only two preferred embodiments of the invention have been illustrated in the accompanying drawings and described in the foregoing specification, it is to be expressly understood that the invention is not limited thereto in any way. Various changes may also be made in the design and arrangement of the parts without departing from the spirit of the invention and the scope of the appended claims, as the same will now be understood by those skilled in the art.

The invention having thus been described, that which is believed to be new and for which protection by Letters Patent is desired, is:

1. A rotary refining furnace, for refining molten metal, comprising, in combination, a relatively elongated circular cross section container having at least a lower arcuate extent of its interior surface sloping downwardly, relative to a horizontal plane, from a first end to a second end thereof; a first circular end plate at said first end of said container having a relatively large diameter opening therein substantially concentric with the axis of said container; a second circular end plate at said second end of said container having a relatively small diameter opening therein substantially concentric with the axis of said container; the relative diameters of said openings being such that a substantially horizontal plane intersecting said larger opening slightly above the lowest arcuate extent thereof will lie below the lowest arcuate extent of said relatively small diameter opening; means mounting said container for rotation about its axis; driving means rotating said container at an angular velocity sufficient to agitate a body of fluid therein while maintaining the body of fluid entirely within said lower arcuate extent of said inner surface and with the upper surface of the fluid body lying generally in said substantially horizontal plane; molten metal supply means extending into said container through said relatively large diameter opening to maintain, within said lower arcuate extent of the interior surface of said container, a substantially constant volume body of molten metal to be refined; slag composition supply means extending into said container through said relatively small diameter opening to continuously supply slag composition at a substantially constant rate to said body of molten metal for melting during such agitation by rotation of the container, with the molten slag composition forming a layer floating on the substantially horizontal surface of said body of molten metal and overflowing through said relatively large diameter opening; and molten metal discharge means adjacent said second end of said container continuously withdrawing molten metal from beneath said slag layer at a substantially constant rate.

2. A rotary refining furnace, as claimed in claim 1, in which said container is a substantially cylindrical container having its axis inclined from said first end downwardly to said second end.

3. A rotary refining furnace, as claimed in claim 1, in which said container is the frustum of a cone having a substantially horizontally extending axis.

4. A rotary refining furnace, as claimed in claim 1, in which said molten metal discharge means comprises a plurality of additional relatively small diameter openings in said second end plate arranged at uniformly spaced intervals around the circumference of a second circle of larger diameter than the diameter of said first mentioned relatively small diameter opening.

5. A rotary refining furnace, as claimed in claim 1, in which said molten metal discharge means comprises a syphon extending into said container through said relatively small diameter opening and having an inlet end disposed beneath the surface of said molten metal body.

6. A rotary refining furnace, as claimed in claim 1, including a gas burner extending into said furnace through said relatively small diameter opening.

7. A rotary refining furnace, as claimed in claim 6, including gas exhaust means communicating with the interior of said container through said relatively large diameter opening in said first end plate.

8. A rotary refining furnace, as claimed in claim 1, including selectively operable valve means included in said molten metal supply means and selectively operable to control the rate of molten metal supplied to said container to maintain therein said substantially constant volume body of molten metal to be refined.

References Cited

UNITED STATES PATENTS

| | | | |
|---|---|---|---|
| 528,016 | 10/1894 | Naef | 263—33 |
| 920,143 | 4/1909 | Hughes | 266—18 |
| 1,051,494 | 1/1913 | Etherington | 263—33 |
| 1,815,946 | 7/1931 | Langer | 75—40 |
| 2,348,673 | 5/1944 | Degner | 266—18 |
| 2,375,932 | 5/1945 | Lohse | 266—18 |
| 2,948,525 | 8/1960 | West et al. | 266—18 |
| 3,113,859 | 12/1963 | Moklebust | 266—18 |

FOREIGN PATENTS

| | | |
|---|---|---|
| 544,367 | 2/1932 | Germany. |
| 1,575 | 5/1869 | Great Britain. |
| 841,152 | 7/1960 | Great Britain. |
| 17,343 | 12/1927 | Netherlands. |

J. SPENCER OVERHOLSER, *Primary Examiner.*

R. S. ANNEAR, *Assistant Examiner.*